United States Patent Office 3,394,896
Patented July 30, 1968

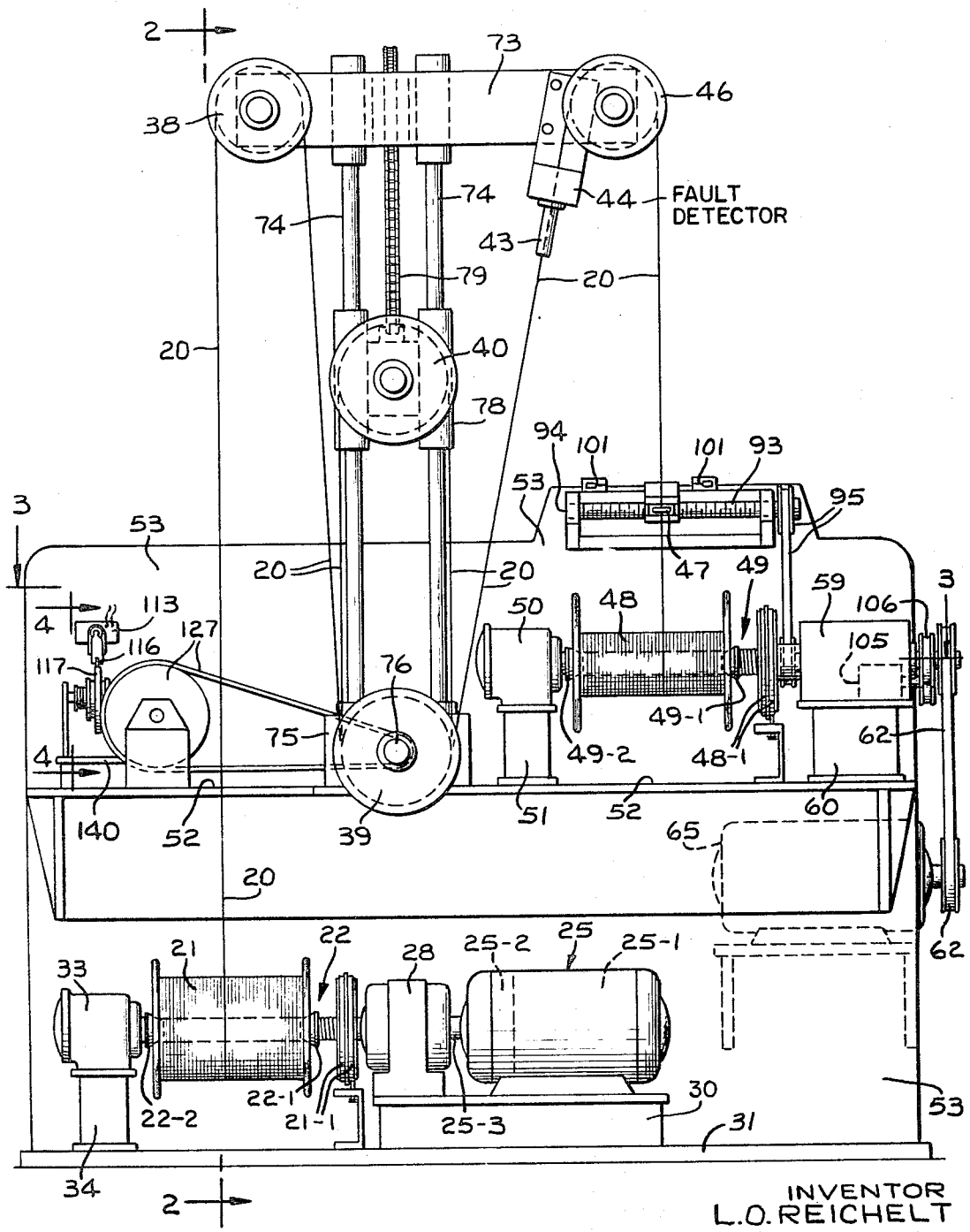

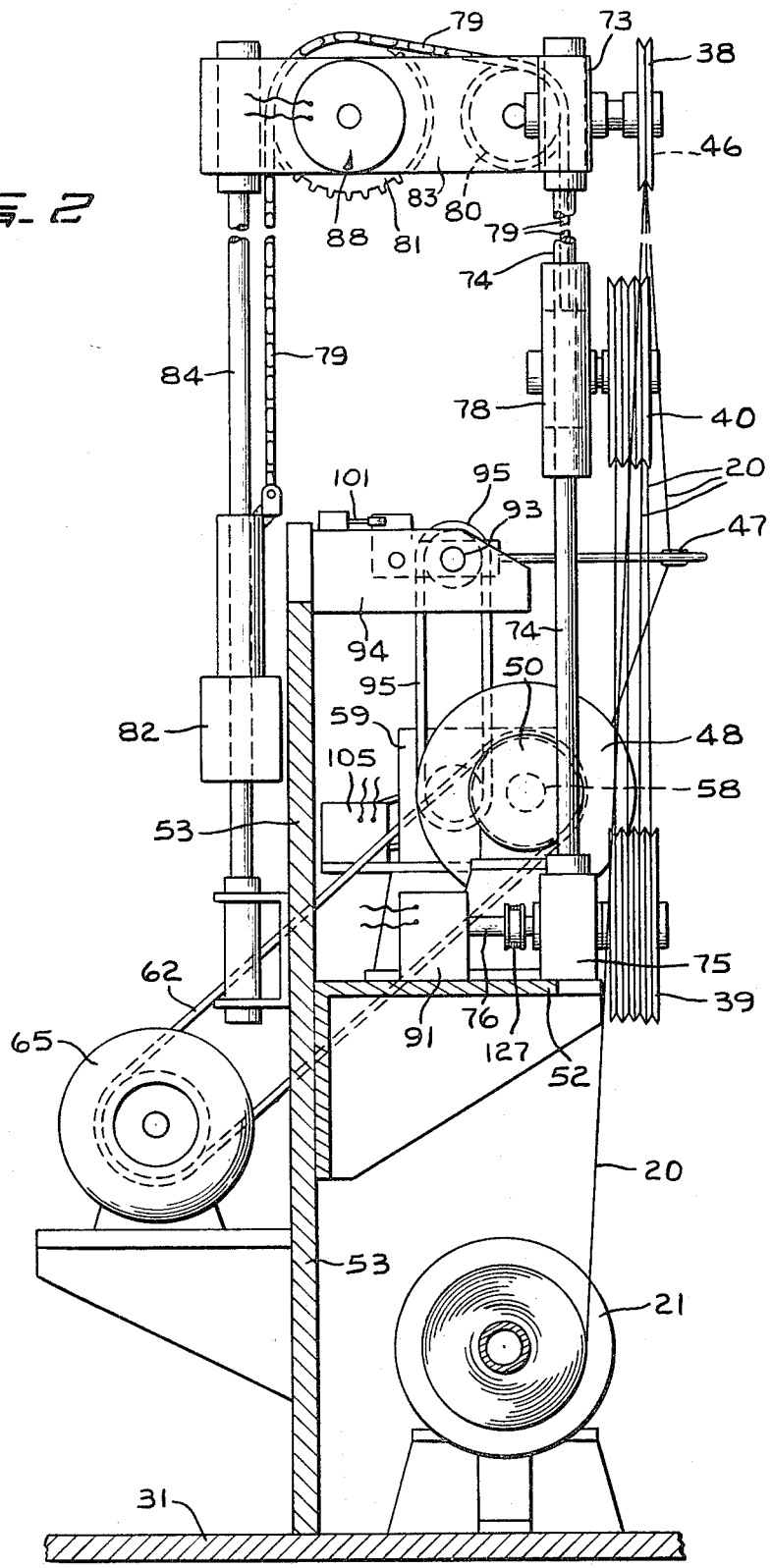

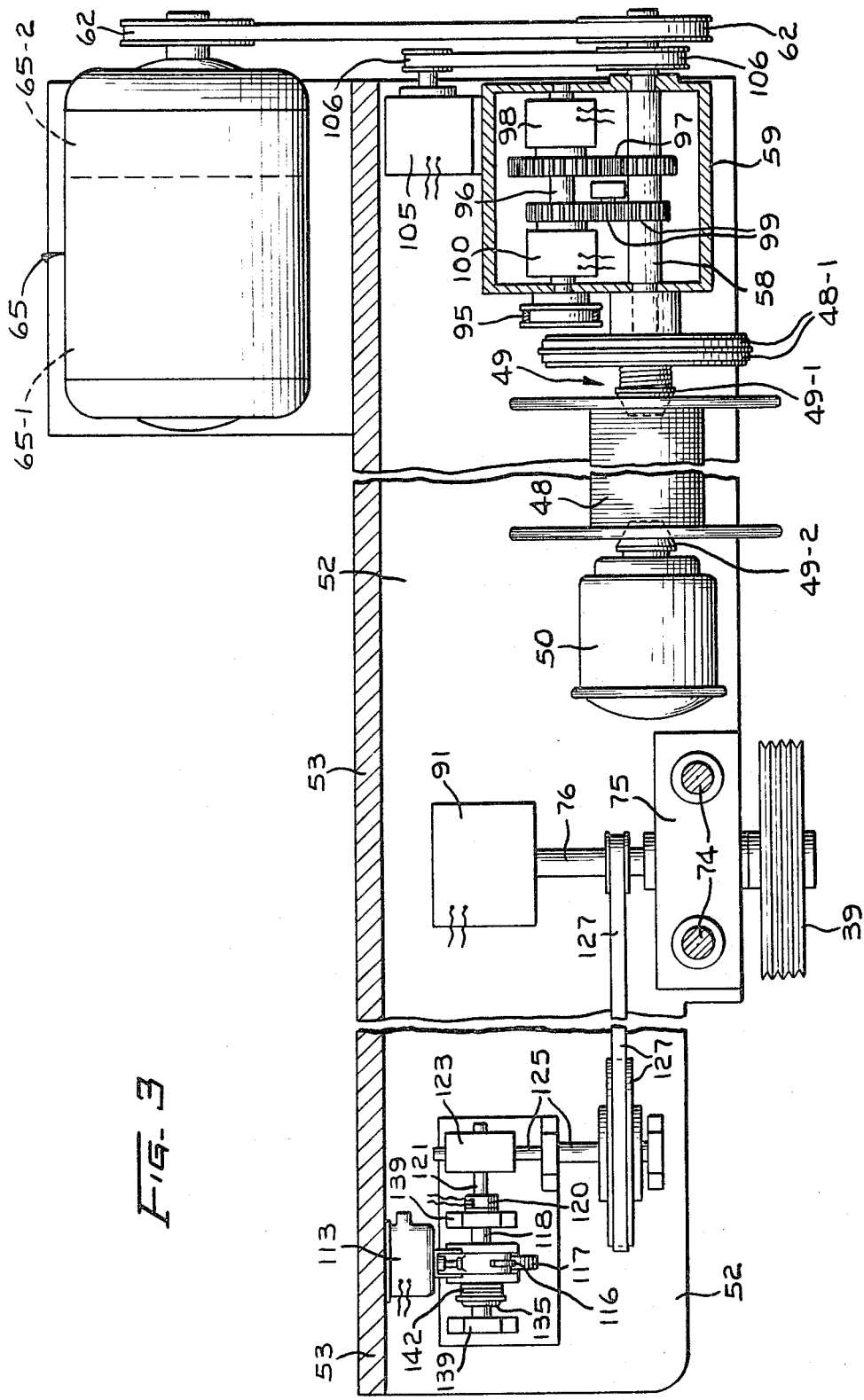

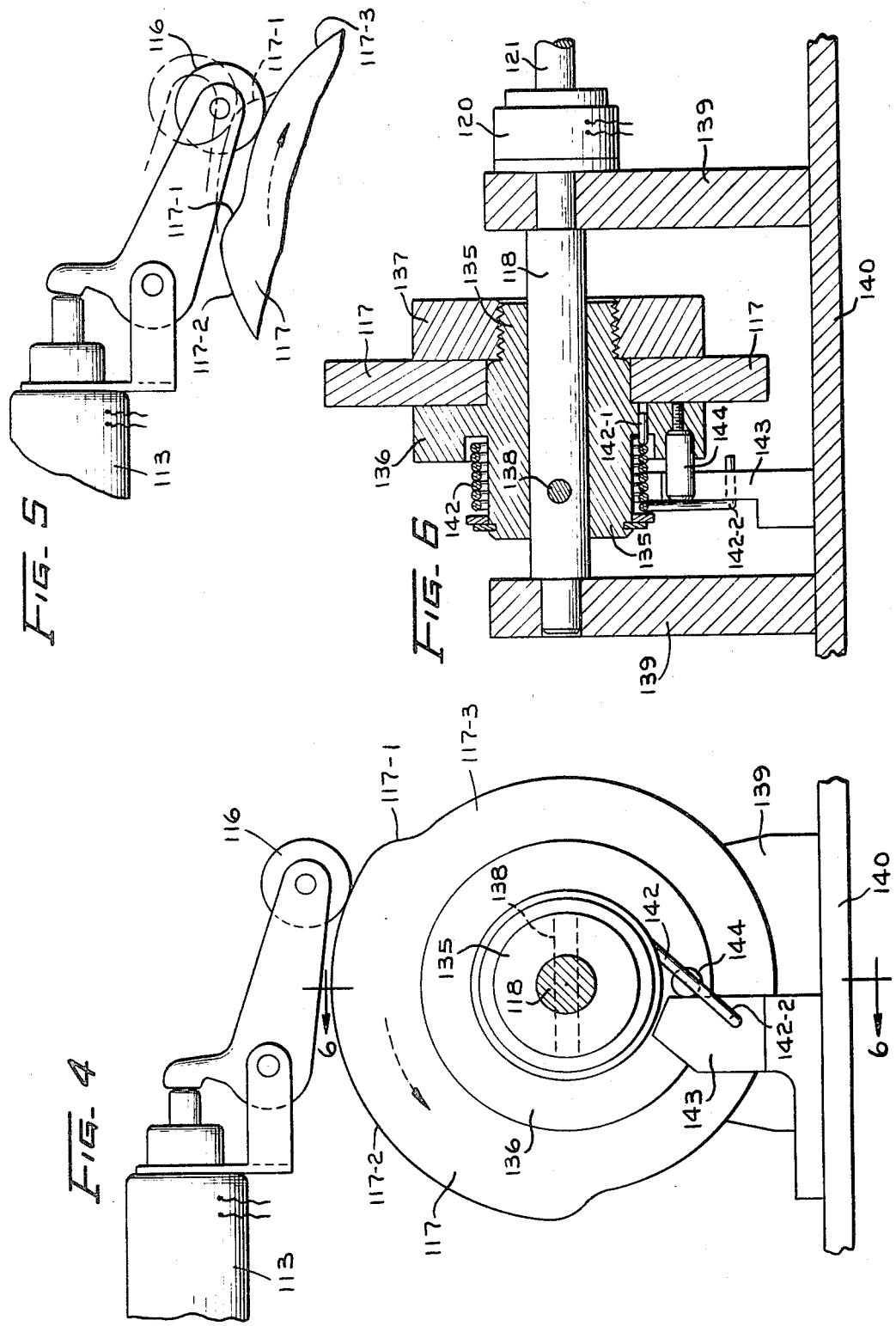

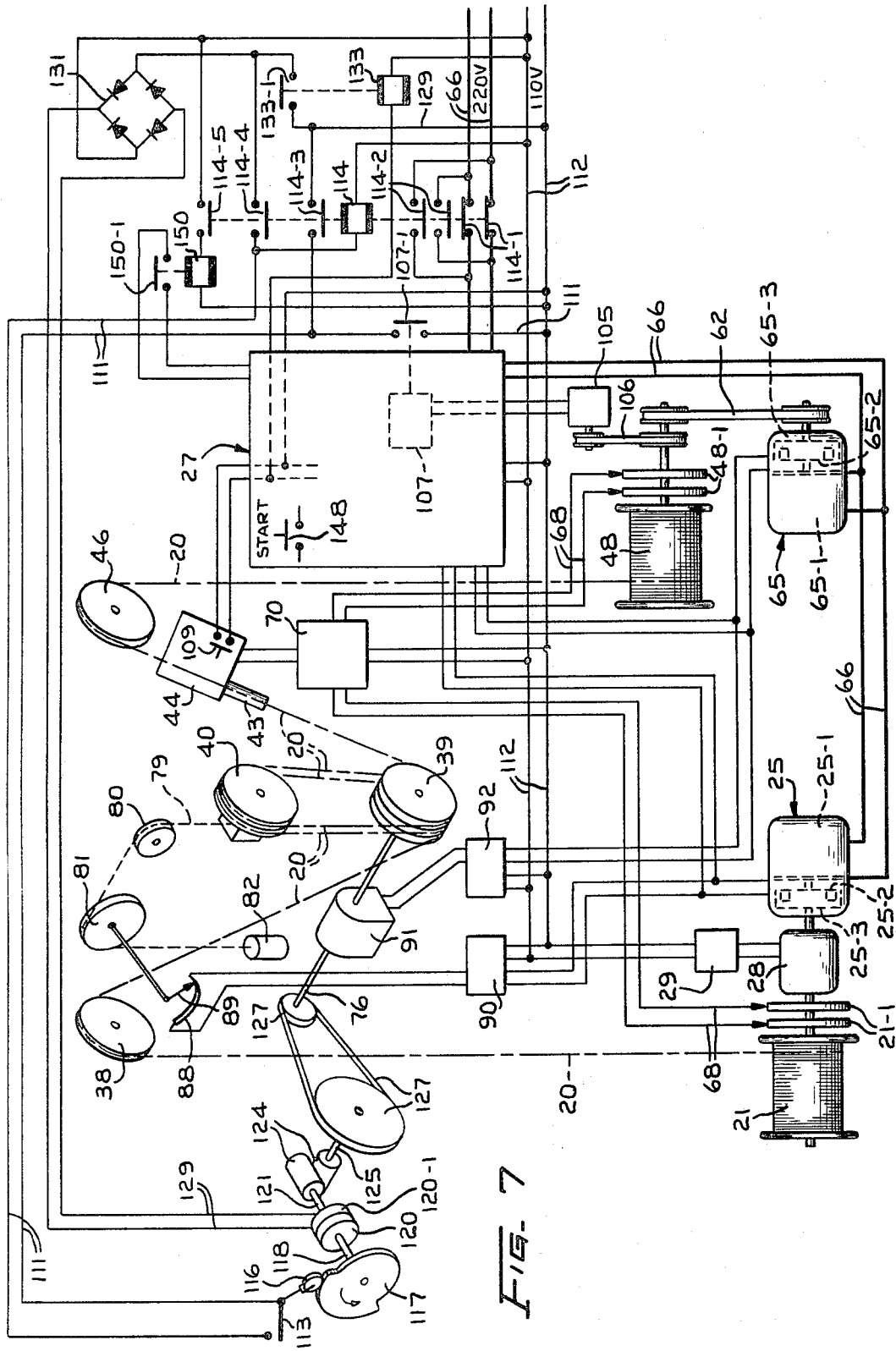

3,394,896
APPARATUS FOR DETECTING A FAULT IN A MOVING WIRE AND FOR STOPPING AND REPOSITIONING THE WIRE FOR REPAIR OF THE FAULT
Lester O. Reichelt, Bristol, Wis., assignor to Western Electric Company, Incorporated, New York, N.Y., a corporation of New York
Filed Jan. 30, 1967, Ser. No. 612,371
6 Claims. (Cl. 242—25)

ABSTRACT OF THE DISCLOSURE

A fault detecting apparatus for insulated wire having a drive for advancing a pair of twisted insulated wires, a device for detecting a fault in the wires, a control responsive to the detection of a fault for reversing the drive to move the wire in the reverse direction, and mechanism including a normally inoperative reversible switch actuating cam rendered operative in response to the detection of the fault and actuated by the movement of the wires for effecting the stopping of the wires, during the reverse movement thereof, in a position with the fault accessible for repair.

---

The present invention relates to an apparatus for automatically locating a fault in an insulated wire, and more particularly to an apparatus for automatically detecting a fault in a pair of advancing insulated wires and positioning the wires with the fault accessible for repair.

An object of the invention is to provide an apparatus for automatically locating a fault in a moving wire and for bringing the portion of the wire with the fault therein to a predetermined position accessible for repair.

A further object of the invention is to provide an apparatus for automatically detecting a fault in a pair of advancing twisted insulated wires, for reversing the direction of movement of the wires, and stopping the wires with the fault in a predetermined position.

An apparatus illustrating certain aspects of the invention may include a first reversible motor drive having an electromagnetic clutch for rotating a supply reel of the twisted wires to pay out the wires therefrom at a uniform rate and a uniform predetermined tension, and a second motor drive having an electromagnetic clutch for rotating a reel for taking up the pair of twisted wires. A control device having a detector mounted in the path of movement of the advancing wires serves in response to the detection of a fault in the wire to deenergize the electromagnetic clutches of the motor drives and allow the reels and the wires to decelerate to a stop, and in response to the stopping of the reels to effect the reversal of the motor drives, the reels, and the wires.

A cam and a normally inoperative drive means therefor is operatively connected to the wires for actuation thereby in response to the detection of a fault in the wires, and after reversal of the direction of movement of the wires and the cam, the latter after a predetermined movement in the reverse direction serves to trip a switch of the control device which then effects the deenergization of the electromagnetic clutches of the motor drives so that the reels and the wires come to a stop with the fault in the wires located in a position accessible for repair of the fault.

Other objects, advantages and novel aspects of the invention will become apparent upon consideration of the following detailed description, in conjunction with the accompanying drawings, in which:

FIG. 1 is a front elevational view of the apparatus embodying the present invention;

FIG. 2 is an enlarged vertical sectional view of the apparatus taken along the lines 2—2 of FIG. 1;

FIG. 3 is an enlarged plan sectional view of the apparatus taken along the line 3—3 of FIG. 1;

FIG. 4 is an enlarged detailed vertical sectional view through the apparatus taken along the line 4—4 of FIG. 1 showing a control switch and an operating cam therefor in a normal starting position;

FIG. 5 is a fragmentary view of the cam in a changed position;

FIG. 6 is a vertical cross sectional view of the cam and associated structure taken along the line 6—6 of FIG. 4; and FIG. 7 is a diagrammatic view of the electrical control system of the apparatus.

The present machine is designed to withdraw a pair of twisted insulated wires 20 from a supply reel 21 thereof (FIGS. 1 and 7), automatically locate a fault therein such as a "short" or an "open," and stop the wires with the fault located in a predetermined accessible position so that the wires may be repaired to eliminate the fault.

The supply reel 21 of twisted wires is supported on a composite arbor 22 comprising a driven arbor element 22–1 and a fluid actuated axially movable arbor element 22–2. A reversible, adjustable-speed motor drive 25 rotates a pair of slip rings 21–1, 21–1, the arbor element 22–1 and the reel 21 to pay off the twisted wires 20, the ends of which are connected to the slip rings 21–1, 21–1. The motor drive 25 is of a well known conventional type having a constant speed motor 25–1 and an electromagnetic clutch 25–2 which in cooperation with a control device 27, indicated diagrammatically in FIG. 7, serves to connect the motor shaft to and disconnect it from the output shaft 25–3. An electrically operated eddy current brake 28 and a control 229 therefor are provided for applying a predetermined braking force to the reel 21 at all times.

As shown in FIG. 1 the pay off motor drive 25 and the eddy current brake 28 are mounted on a stand 30 which is secured to a horizontal base plate 31. The arbor element 22–2 is moved toward and from the arbor element 22–1 by a fluid operated actuator 33 which is supported on a stand 34 secured to the base plate 31.

As the insulated twisted wires 20 hereinafter referred to as the wires, leave the supply reel 21 they advance around an upper fixed pulley 38, downwardly therefrom and several times around a multiple sheave fixed pulley 39 and an upper multiple sheave floating pulley 40, thence upwardly from the pulley 39 and through a probe 43 of an electrical fault detector 44. From the fault detector the wires 20 pass around an upper fixed pulley 46, downwardly through a distributing member 47 and onto a takeup reel 48 which is supported on a composite arbor 49 including a driven arbor element 49–1 and an adjustable arbor element 49–2.

The arbor element 49–2 is adapted to be moved horizontally by a fluid operated actuator 50 which is mounted on a stand 51. The stand 51, in turn, is mounted on a horizontal platform 52 which is secured to a vertical frame plate 53 (FIG. 2) extending upwardly from the base plate 31.

The driven arbor element 49–1 (FIG. 3) is secured to the end of a drive shaft 58 which is supported in a housing 59. The latter is mounted on a stand 60 (FIG. 1) on the platform 52. Through a pulley and belt drive 62 the shaft 58 is connected to the output shaft of a reversible adjustable motor drive 65. The latter is of the same type as the motor drive 25 and has a constant speed motor 65–1 and an electromagnetic clutch 65–2 which effects the connection and disconnection of the motor shaft and the output shaft under the direction of the control device 27

(FIG. 7). Both of the motors 25–1 and 65–1 are connected through the control device 27 to power lines 66.

The arbor elements 22–1 and 49–1 are provided, respectively, with pairs of slip rings 21–1, 21–1 and 48–1, 48–1 to which both of the ends of the pair of wires 20 are electrically connected. The slip rings 21–1 and 48–1 are electrically connected through conductors 68 with a test device 70 (FIG. 7) which is provided with switches for selectively connecting the wires 20 to the fault detector 44 in accordance with the type of fault being detected.

As shown in FIGS. 1 and 2 the upper fixed pulleys 38 and 46 are rotatably supported on a horizontally disposed frame member 73 which also supports the fault detector 44 and is secured to the upper ends of a pair of supporting rods 74. The lower ends of the rods 74 are secured to a base member 75 that is mounted on the platform 52 and supports a horizontally disposed shaft 76 on which one of the sheaves of the multiple-sheave pulley 39 is secured. Movable on the vertical rods 74 is a slide 78 which supports the multiple-sheave, floating pulley 40. A chain 79 connected at one end to the slide 78 extends upwardly therefrom over sprockets 80 and 81 and is connected at its other end to a counterweight 82 which urges the floating pulley 40 upwardly to apply a predetermined tension to the wires 20. The sprockets 80 and 81 are mounted on a horizontal frame member 83 which is secured to the frame member 73 and to a rod 84. The rod 84 is suitably connected at its lower end to the vertical frame plate 53 and guides the counterweight 82 for vertical movement.

The stationary and the movable multiple-sheave pulleys 39 and 40, respectively, form a compensating device for supporting varying lengths of the wires 20 as the wires are being transferred from the supply reel to the takeup reel. Controls are provided for varying the rate of rotation of the supply reel 21 and of the takeup reel 48 to maintain a substantially uniform rate of movement of the wires 20 at a predetermined tension as they are being unwound from the supply reel and wound onto the takeup reel.

Referring to FIGS. 2 and 7 a control member such as a potentiometer 88 is mounted on the horizontal frame member 83, and the movable arm 89 thereof is connected to the sprocket 81 for rotary movement therewith as the chain 79 imparts movement to the sprocket in response to up and down movement of the pulley 40. The potentiometer 88 is asociated with a control device which is indicated diagrammatically at 90 and is electrically connected to the magnetic clutch 25–2 for varying the speed of the supply reel 21 as the wires are unwound therefrom. A tachometer generator 91 (FIGS. 2, 3 and 7) is driven by the shaft 76 and the pulley 39 and in cooperation with an electrical control device 92 serves to condition the electromagnetic clutch 65–2 and vary the speed of the takeup reel 48 as the wire is wound thereonto.

Referring to FIGS. 1 and 2, the distributor member 47 is mounted for horizontal reciprocation on a reversible lead screw 93 which is supported in a bracket 94 on the vertical frame plate 53. Through a belt and pulley drive 95, the lead screw 93 is connected to an auxiliary drive shaft 96 (FIG. 3) that is rotatably supported in the housing 59 in parallel relation to the drive shaft 58. The auxiliary drive shaft 96 is connectible through gearing 97 and a selectively operable magnetic clutch 98 to the drive shaft 58 for rotation in one direction and is connectible through reverse gearing 99 and a selectively operable magnetic clutch 100 to the drive shaft 58 for rotation in the reverse direction. A pair of switches 101 mounted on the bracket 94 (FIG. 1) are actuated alternately by the distributing member 47, as it moves back and forth, to effect the selective energization of the magnetic clutches 98 and 100 by applying electrical energy alternately thereto, thus causing the distributing member 47 to reverse direction immediately upon striking one of the switches 101.

A tachometer generator 105 (FIGS. 3 and 7) is connected through a sprocket and chain drive 106 to the shaft 58 which rotates the takeup reel 48. The signal voltage from the generator 105 is applied to a zero speed switch 107, the contacts 107–1 of which are open while the reel 48 is rotating.

When a fault in the advancing pair of wires 20 is moved through the probe 43, the fault detector 44 operates to close a normally open switch 109 (FIG. 7) and cause the control device 27 to deenergize the electromagnetic clutches 25–2 and 65–2 and cause the reels and the wires to decelerate for a predetermined interval and come to a stop under the influence of the eddy current brake 28 and with the wires under a controlled tension. The tachometer generator 105 and the signal voltage therefrom also come to a stop with the takeup reel 48 and effect the operation of the zero speed switch 107 and the closing of the contacts 107–1 thereof.

The contacts 107–1 of the zero speed switch 107 are connected by conductors 111 to a source of power 112 in series with a cam actuated normally open control switch 113 and a motor reversing relay 114. The motor reversing relay 114 has a pair of normally closed contacts 114–1, 114–1 in the main power line 66 for effecting the operation of the motors 25–1, 65–1 in the forward direction and a pair of normally open contacts 114–2, 114–2 which are adapted to be closed in response to energization of the relay 114 to effect the reversal of the motors. In addition the relay has three sets of normally open circuit conditioning contacts 114–3, 114–4, and 114–5.

The control switch 113 has a cam follower 116 riding on a normally unoperative rotary cam 117 which is mounted on a shaft 118 for rotation therewith. The shaft 118 is connected to one element of a solenoid actuated clutch 120 (FIGS. 3, 6, and 7) the other element of which is secured to a shaft 121. The shaft 121 is supported in a gear housing 123 (FIG. 3) and is connected through a pair of helical gears 124 (FIG. 7) to a counter shaft 125. The counter shaft in turn is connected through a pulley and belt drive 127 to the drive shaft 76 to which the multigroove pulley 39 is secured. The normally unoperative cam 117 is rendered operative in response to the energization of the clutch 120 for rotation by the moving wires in both a forward direction and a reverse direction through the drive components 39, 76, 127, 125, 124, 121, 120 and 118 in synchronism with the movement of the wires 20 and at a reduced rate of movement relative thereto.

The solenoid 120–1 of the clutch 120 is connected by conductors 129 to the power lines 112 in series with a rectifier 131 and a pair of normally open relay contacts 133–1 of a relay 133 and the latter is connected across the power lines 112 in series with the normally open switch 109 of the fault detector 44. Thus, in response to detection of a fault and the closing of the switch 109 the clutch control relay 133 is energized to effect the closing of the relay contacts 133–1, the energization of the clutch 120 and the rotation of the cam 117 in a clockwise direction as viewed in FIGS. 4 and 7.

As shown in FIGS. 4 and 6, the cam 117 is in the form of an apertured disc which is seated on a sleeve 135 against an annular flange 136 thereof and is clamped thereto in adjusted position by a nut 137. The sleeve 135 is keyed by a pin 138 to the shaft 18 which is supported in a pair of bearing brackets 139. The latter are mounted on a stand 140 on the platform 52. The cam sleeve 135 and shaft 118 are thus rotatably supported as a unit and are urged for rotation in a clockwise direction to a normal starting position as viewed in FIG. 4 by a helical torsion spring 142 one end 142–1 of which is anchored to the sleeve and the other end 142–2 of which is secured to a stationary stop member 143 on the stand 140. A pin 144 extending from the flange 136 of the sleeve 135 engages the stop 143 to limit the rotary movement of the cam 117 in one direction and to locate the cam in the normal starting position. The cam has a sloping surface 117–1 for actuating the switch 113 to and from open and closed positions and has two concentric dwell surfaces 117–2 and 117–3, respectively, engageable with the switch follower 116 for releasably supporting the switch 113 in such positions.

The cam 117 in cooperation with the control switch 113 and associated circuitry serve to effect the deenergization of the magnetic clutches of the motor drives 25 and 65 at a predetermined time during the reverse rotation so that when the reels 21 and 48 and the wires 20 decelerate for a predetermined interval and come to a stop, the fault is disposed between the probe 43 and the pulley 39 in a preselected position accessible for repair of the fault.

OPERATION

In setting up the apparatus for detecting a fault in a pair of twisted wires 20 of a full supply reel thereof, the reel is mounted on the supply arbor 22 and the wires are threaded around the upper pulley 38, around the multigroove pulleys 39 and 40, then upwardly from the pulley 39 through the probe 43 of the fault detector 44 and over the upper stationary pulley 46, thence down through the distributor 47, and are attached to the empty reel 48 on the takeup arbor 49. The ends of the wires are connected to the slip rings 21–1, 48–1 associated with the reels and the test device 70 is adjusted to connect the wires to the fault detector 44 in accordance with the type of fault to be detected.

The start button 148 (FIG. 7) of the control device 27 is then pressed to cause the electromagnetic clutches 25–2 and 65–2 to effect the coupling of the motor drives 25 and 65 to the reels 21 and 48, respectively, and the advancement of successive portions of the wires 20 through the fault detector 44 and onto the takeup reel 48. The control devices 88, 90 and 91, 92 serve to vary the rate of rotation of the reels 21 and 48 to maintain the advancement of the wires 20 at a uniform rate and with a predetermined tension as the wires are unwound from the supply reel and wound onto the takeup reel.

As the fault in the pair of wires 20 moves through the probe 43 of the fault detecting device 44 the latter operates to close a circuit through the switch 109 and thereby effect the energization of the relay 133 and the closing of normally open relay contacts 133–1. This completes a circuit through the rectifier 131 and the clutch solenoid 120–1, causing the energization of the solenoid and the operation of the clutch 120 to establish a driving connection between the shafts 118 and 121 and imparting rotation to the cam 117 in a counterclockwise direction as viewed in FIGS. 4 and 7 from its normal starting position.

Simultaneously with the detection of the fault by the fault detector 44 the control device 27 effects the deenergization of the electromagnetic clutches 25–2 and 65–2 whereupon the reels 21 and 48 decelerate for a predetermined interval and come to a stop.

While the reels are decelerating in the forward direction to a stop, the cam 117 is being rotated through a predetermined distance from the normal starting position as shown in FIG. 4 to the position shown in full lines in FIG. 5. At an intermediate portion of this movement the cam follower 116 rides down the sloping cam surface 117–1 and effects the actuation of the control switch 113 from the normally open position to the closed position to condition a portion of the control circuitry. When the reels 21 and 48 and the wires 20 come to a stop the portion of the wires containing the fault has been advanced a substantial distance and wound onto the takeup reel 48.

The tachometer generator 105 driven in synchronism with the takeup reel 48, likewise continues to rotate until the reel 48 comes to a stop at which time the signal voltage generated by the tachometer also comes to a stop. This effects the operation of the zero speed switch 107 and the closing of the contacts 107–1 thereof. With the closing of the zero speed switch contacts 107–1 and the prior closing of the control switch 113 by the cam 117 a circuit is completed thereby through the motor reversing relay 114 to effect its energization and the movement of the normally closed contacts 114–1 thereof to open position, the movement of the normally open contacts 114–2 thereof to the closed position, and the reversal of the motors 25–1 and 65–1, and also the movement of the normally open conditioning contacts 114–3, 114–4, 114–5 to closed position.

The closing of the contacts 114–3 locks in the motor reversing relay 114 across the power line 112, and the closing of the contacts 114–4 effects the transfer of the solenoid 120–1 into series connection with the control switch 113. The closing of the contacts 114–5 effects the energization of a time delay relay 150 and the closing of the relay contacts 150–1 after a predetermined delay, thereby completing a circuit of the control device 27 and effecting the energization of the eelctromagnetic clutches 25–2 and 65–2 and the reverse rotation of the motors 25 and 65 and the reels 21 and 48 at a predetermined reduced speed.

The wires 20 are moved thereby in the reverse direction and impart a reverse rotation to the pulley 39 and the drive mechanism connected thereto (76, 127, 125, 124, 121) including the energized clutch 120 and the cam 117. After the cam 117 rotates through a predetermined distance in the reverse or clockwise direction from the position as shown in full lines in FIG. 5 the cam follower 116 rides up the sloping surface 117–1 (FIG. 5) and actuates the switch 113 from the closed position to the open position.

The opening of the switch 113 by the cam 117 effects the deenergization of the motor reversing relay 114 and simultaneously therewith the deenergization of the clutch solenoid 120–1. With the deenergization of the reversing relay 114 the motors 25–1 and 65–1 are disconnected from the power line 66 and the reels 21 and 48 coast for a predetermined interval to a stop, and the portion of the wires 20 containing the fault moves reversely through the probe 43 and comes to a stop in a preselected position, preferably between the probe and the pulley 39, in which position the portion of the wire with the fault therein is accessible for repair. With the deenergization of the clutch solenoid 120–1 at an intermediate point in the reverse movement of the cam 117 and the drive shaft 121, the cam 117 is released from the drive shaft 121 and the torsion spring 42 serves to continue the reverse rotation of the cam 117 to its normal starting position (FIG. 4) with the stop pin 144 in engagement with the stop member 143.

It will be noted that in response to the detection of a fault in the wires by the fault detector during the forward movement of the wires two things happen simultaneously; (a) the electromagnetic clutches of the drive motors are deenergized and the reels and the wires decelerate for a predetermined interval to a stop, and (b) the cam 117 is operatively connected to the wires and starts moving forward in synchronism therewith as a result of the energization of the relay 133 and the clutch solenoid 120–1. At an intermediate portion of the forward movement of the cam 117 the cam follower 116 rides down the cam slope 117–1 and actuates the switch 113 to closed position in which it remains during the remainder of the forward decelerating movement of the wires and during which the sloping cam surface 171–1 travels a predetermined distance from the cam follower 116. This distance of the sloping cam surface 117–1 from the cam follower 116 is such as to effect the actuation of the switch 113 to open position, the disconnection of the motors 25 and 65 from the power lines 66, the deenergization of the electromagnetic clutches 25–2, 65–2 at a predetermined point during the reverse movement of the cam 117 so that the length of decelerating movement of the wires to a stop will bring the fault to the preselected position in the apparatus in which the fault is accessible for repair. The correct normal starting position of the cam on the shaft which is necessary to effect the disconnection of the reels from the motor drives and the stopping of the wires with the fault located in the desired accessible position may be determined empirically and the cam 117 so adjusted and locked on the shaft.

The cam 117 and the sloping cam surface 117-1 thereon serve as a control element which is selectively connectible operatively to the wires 20 for forward and reverse movement therewith and serves to actuate the switch 113 at a predetermined point during the reverse movement of the wires to effect the deenergization of the magnetic clutches of the motor drives and the deceleration and stopping of the reels and the wires with the fault in the preselected position.

After the wires have been repaired to eliminate the fault and with the motor reversing relay contacts 114-1 closed to effect forward rotation of the motor drives 25 and 65, the start button 148 of the control device 27 may be pressed to effect the resumption of the operation of the apparatus and the forward movement of the wires.

From the foregoing disclosure it will be apparent that an effective automatic fault locating apparatus has been provided embodying mechanisms for advancing a pair of wires at a uniform rate, for detecting a fault in the wires, for stopping the wires in response to the finding of a fault therein, for automatically reversing the wires, and for stopping the reverse movement of the wires with the fault therein located in a position on the apparatus accessible for repair of the fault.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for locating a fault in an insulated wire capable of being wound from or onto either of a pair of reels which comprises:
    means engageable with the wire at a pair of spaced portions and including a pair of reversible drive means for moving the wire along a predetermined path in forward and in reverse directions;
    stationary means for detecting a fault in the moving wire; and
    control means responsive to the detection of a fault in the wire for rendering said drive means, respectively, inoperative whereby the wire comes to a stop;
    wherein the improvement comprises the combination therewith of:
    means responsive to the stopping of the wire for reversing said drive means, respectively, to effect the movement of the wire in the reverse direction;
    normally inoperative means rendered operative in response to the detection of a fault in the wire for forward and reverse movement under control of the wire and in synchronism therewith; and
    means responsive to the reverse movement of said last named means to a predetermined position for rendering said drive means inoperative so that when the reels and the wire come to a stop the fault is in a preselected position.

2. Apparatus for locating a fault in a pair of twisted insulated wires as they are transported between a supply reel and a take-up reel which comprises:
    a first reversible drive means for rotating the supply reel to pay off the wires therefrom;
    a second reversible drive means for rotating the take-up reel for advancing and taking up the wires;
    means mounted in the path of movement of the wires for detecting a fault in the wires; and
    control means responsive to the detection of a fault in the wires for rendering said first and said second drive means inoperative whereby the reels and the wires decelerate to a stop;
    wherein the improvement comprises the combination therewith of:
    means responsive to the stopping of said reels and said wires for reversing said first and said second drive means to effect the movement of the wires in the reverse direction;
    an element mounted for forward movement from and reverse movement to a normal position along a predetermined path;
    means responsive to the detection of a fault in the wires for effecting a driving connection between said element and the wires for forward and reverse movement of said element in synchronism with the wires; and
    means operable in response to the reverse movement of said element to a predetermined position for rendering said first and said second drive means inoperative whereby the reels and the wires come to a stop with the fault in a preselected position.

3. An apparatus as defined in claim 2 including the provision of:
    resilient means for urging said element for reverse movement to said normal position.

4. An apparatus for locating a fault in a pair of twisted insulated wires as they are transported between a supply reel and a take-up reel which comprises:
    a first reversible drive means for rotating the supply reel to pay off the wires therefrom;
    a second reversible drive means for rotating the take-up reel for advancing and taking up the wires;
    means including a probe mounted in the path of movement of the wires for detecting a fault in the wires;
    means responsive to the detection of a fault in the wires for rendering said first and said second drive means inoperative whereby the wires and the reels come to a stop; and
    wherein the improvement comprises the combination therewith of:
    a third drive means driven by the wires in forward and reverse directions;
    an element mounted for forward movement along a predetermined path from a normal position and for reverse movement to said position;
    means responsive to the stopping of the forward movement of said reels and said wires for reversing said first and said second drive means to effect the movement of the reels and the wires in the reverse direction;
    means responsive to the detection of a fault in the wires for effecting a driving connection between said element and said third drive means for forward and reverse movement of said element in synchronism with said wires; and
    means responsive to the movement of said element in the reverse direction to a predetermined position for rendering said first and said second drive means inoperative whereby the reels and the wires come to a stop with the fault in a preselected position.

5. An apparatus for locating a fault in a pair of twisted wires as they are transported between a supply reel and a take-up reel which comprises:
    a first reversible drive means for rotating the supply reel to pay off the wires therefrom;
    a second reversible drive means for rotating the take-up reel for advancing and taking up the wires; and
    means including a probe mounted in the path of movement of the wires from the pay off reel to the take-up reel for detecting a fault in the wires;
    wherein the improvement comprises the combination therewith of:
    a holder mounted for forward and reverse movement along a predetermined path;

an element adjustably secured to said holder for forward and reverse movement therewith;

resilient means for urging said holder and said element for movement in the reverse direction to a normal starting position;

means for adjusting the position of said element on said holder along the path of travel thereof;

a third drive means driven by the wires in forward and reverse directions;

normally inoperative clutch means for interconnecting said third drive means and said holder;

control means responsive to the detection of a fault in the wires for rendering said first and said second drive means inoperative whereby the wires and the reels decelerate to a stop, and for rendering said clutch means operative to effect a driving connection between said holder and said third drive means for forward and reverse movement of said holder and said element in synchronism with the wires;

means responsive to the stopping of the forward movement of the reels and the wires for reversing said first and said second drive means to effect the movement of the wires in the reverse direction; and means responsive to the movement of said element in the reverse direction to a predetermined position for rendering said first and said second drive means inoperative whereby the wires come to a stop with the fault in a preselected position.

6. An apparatus for locating a fault in a pair of twisted wires as they are transported between a supply reel and a take-up reel which comprises:

a first reversible drive means for rotating the supply reel to pay off the wires therefrom;

a second reversible drive means for rotating the take-up reel for advancing and taking up the wires;

means including a probe mounted in the path of movement of the wires from the pay off reel to the take-up reel for detecting a fault in the wires; and means responsive to the detection of a fault in the wires for rendering said first and said second drive means inoperative whereby the reels and the wires decelerate to a stop;

wherein the improvement comprises the combination therewith of:

means responsive to the stopping of the forward movement of the reels and the wires for reversing said first and said second drive means to effect the movement of the wires in the reverse direction;

a holder mounted for forward and reverse rotary movement;

a control element adjustably secured to said holder for forward and reverse rotary movement therewith along a predetermined path;

resilient means for urging said holder and said control element for movement in the reverse direction to a normal starting position;

a third drive means including a rotary member engageable with and driven by the wires in forward and reverse directions;

means responsive to the detection of a fault in the wires for establishing a driving connection between said third drive means and said rotary holder for forward and reverse rotation of said element in synchronism with the wires; and means including a switch mounted in the path of movement of said control element for actuation thereby in response to the reverse movement of said control element to a predetermined position for rendering said first and said second drive means inoperative whereby the wires come to a stop with the fault in a preselected position.

References Cited

UNITED STATES PATENTS

| | | | |
|---|---|---|---|
| 1,944,581 | 1/1934 | Snyder | 242—25 |
| 2,561,725 | 7/1951 | Boynton | 242—25 |
| 2,979,275 | 4/1961 | Bigland et al. | 242—25 |
| 3,040,512 | 6/1962 | Reichelt | 242—36 |

FRANK J. COHEN, *Primary Examiner.*